No. 841,568. PATENTED JAN. 15, 1907.
F. J. PECK.
EYEGLASSES.
APPLICATION FILED MAY 26, 1905.
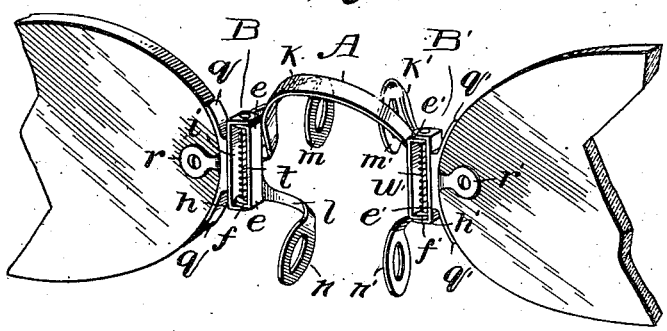
Fig. 1.
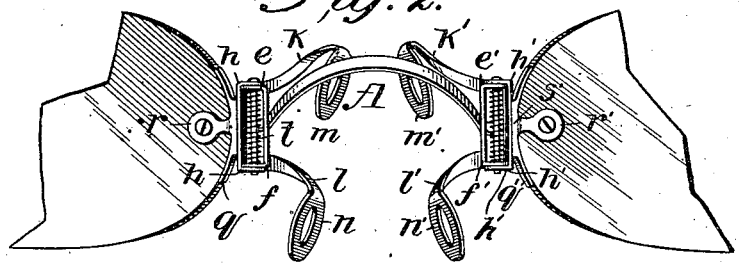
Fig. 2.
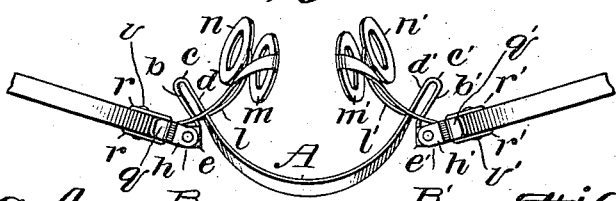
Fig. 3.
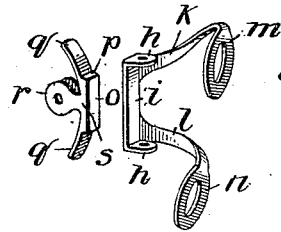
Fig. 4.
Fig. 6.
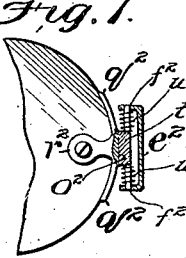
Fig. 7.
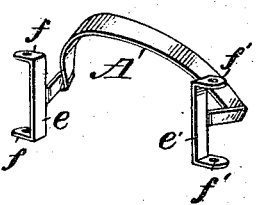
Fig. 5.
Fig. 8.
Inventor
Fred J. Peck
By
Walter A. Holden
his Attorney
Witnesses

UNITED STATES PATENT OFFICE.

FRED J. PECK, OF ANSONIA, CONNECTICUT.

EYEGLASSES.

No. 841,568.  Specification of Letters Patent.  Patented Jan. 15, 1907.

Application filed May 26, 1905. Serial No. 262,358.

*To all whom it may concern:*

Be it known that I, FRED J. PECK, a citizen of the United States, residing at Ansonia, in the county of New Haven, in the State of Connecticut, have invented a new and useful Improvement in Eyeglasses, of which the following is a specification.

My invention relates to eyeglasses, and particularly to that class of the same which when in their proper position in front of the eyes may be released from the nose by swinging forward the lenses out of their normal plane. In this class of eyeglasses the longitudinal axis of the lenses always remains in a substantially horizontal plane, which is essential in the case of lenses ground cylindrically to correct for astigmatism and other purposes. This movement of the longitudinal axis of the lenses in a horizontal plane is thus more advantageous than that wherein the lenses are moved in their normal vertical plane or in some other direction to release the guards from the nose, since in the latter cases the longitudinal axis of the cylindrically-ground lenses would not always be parallel with the longitudinal axis of the retina, which position, as heretofore stated, is essential for the correction for astigmatism and other purposes, depending upon the parallelism with the longitudinal axis of the retina and that of the lenses. Heretofore in the art it has sometimes been the custom in using eyeglasses of this character to pull the lenses apart from each other in their own plane against the action of a spring, or, as heretofore stated, to swing forwardly their outer edges, respectively, the said movement being resisted by a resilient bridge portion either in the form of a flat spring alone or the same together with coiled or bended extremities.

It is the purpose of my invention to construct a pair of eyeglasses which will release themselves from gripping the nose when the outer edges of the respective lenses are swung forwardly, as heretofore described. In my device, however, the bridge-piece is rigid and not resilient and may be of the saddle type.

The guard or guard-pieces, which include the means for gripping the nose, are rigidly fastened to or integral with their respective lens-holders. Each guard-piece and its adjacent lens-holder will always be termed hereinafter in this specification and in the following claims by the expression "guard and lens piece," "lens-piece," or "lens and guard piece" in either the singular or plural number, as it is my intention that nothing in this specification shall be construed other than that each guard-piece and its adjacent lens-holder are one single and rigid element for which no proper definitive term other than those herein used can be found.

From the description of the three parts described above it may be readily seen that my invention consists of a rigid bridge having a rigid guard and lens piece journaled, respectively, to each side thereof, together with yielding means so connected to each pair of journaled parts that the swinging of any of the said parts on their journal connections will always keep the longitudinal axis of the lenses in the same horizontal plane with the longitudinal axis of its respective retina.

My invention further consists in the peculiar construction of the separate parts above mentioned and also in certain details and arrangements of the various parts, which will be hereinafter more specifically described, reference being had to the accompanying drawings, on which like reference characters denote corresponding parts.

In the drawings, Figure 1 is a perspective view of my invention. Fig. 2 is a front elevation. Fig. 3 is a top plan view. Fig. 4 is a perspective view of one of the guards and corresponding lens-piece. Fig. 5 is a perspective view of the bridge alone. Fig. 6 is an elevation of the pin and spiral spring. Figs. 7 and 8 are fragmentary views of a modification of the yielding journal connection.

All of the views are made much larger than the dimensions of the device when sold commercially, for the purpose of illustrating clearly the details.

Referring particularly to Figs. 2 and 3, A is the saddle-bridge, which fits snugly over the front of the nose, the respective ends of which are bent upon themselves, and each extremity terminates in two lugs, one above the other. The two guard and lens pieces are referred to as a whole by the letters B B', respectively. Thus the invention is generally made up of the three parts A B B', all of which are integral or in one rigid piece in themselves and are held in yielding resistance to each other by the pin $t$ and spring $u$. (Shown in Fig. 6.) As the two guard and lens pieces are of similar construction, the one being merely the reverse of the other, I will confine my more detailed description to the saddle-bridge and its adjacent guard and lens piece on the left side of said saddle-bridge, in order that the guard and lens piece adjacent to the right of the saddle-bridge may be hereinafter described more easily and with less detail.

As heretofore stated, each guard-piece and its respective lens-piece are integral or rigid in themselves; but for the purpose of illustration I will describe these parts as two separate pieces, as shown in Fig. 4, in which $m$ and $n$, respectively, are the grips of the guards, which are adapted to be in contact with the nose when the eyeglasses are gripped thereon in their normal position. Each of these grip-plates $m$ and $n$ contain an orifice and have their surfaces corrugated for the purpose of creating a peculiar pressure on the side of the nose, and their perimeters terminate, preferably, near their upper portions in the arms $k$ and $l$, which connect the nose-grips with the vertical journal-arm $i$. The arms $k$ and $l$ may be bent or twisted to bring the same to any desired contour for the purpose of adjustment to the nose and to avoid contact with the bend in the saddle-bridge which passes between them, as will be hereinafter described. The vertical journal-arm $i$ terminates in two lugs $h\ h$ at its upper and lower extremities, the said lugs being bent inwardly toward the saddle-bridge and containing apertures for the post or pin $t$, which latter is screw-threaded at its lower extremity. The lower lug $h$ is internally screw-threaded for the purpose of receiving the external screw-threads on the pin $t$.

The guards are made out of flat or ribbon-like stock, and the same may be sheared, bent or struck up, and twisted out of one single piece.

The lens-holder consists of a body portion having an inner face $o$ and top and bottom faces $p$. (The latter not shown.) The outer face of this body portion terminates upwardly and downwardly, respectively, in the rims $q\ q$, and from the middle of its side portions extend outwardly the side arms $r\ r$, which arms are pierced for the purpose of taking a pin $v$. The inner end of the lens passes between the arms $r\ r$ and has its inner edge in close contact with the outer faces of the rims $q\ q$ and the outer face of the intermediate body portion of the lens-holder, (not shown,) as is the common method of fastening the lens to the lens-holder. The outer face of the vertical journal-arm $i$ of the guard is soldered to the inner face $o$ of the lens-piece, or the two parts may be made integral in any other manner, as by screwing the one to the other or making the whole out of one single piece of metal, or in any other manner, so long as they constitute one rigid piece. The saddle portion of the bridge terminates at its end adjacent to said guard and lens piece in a vertical journal-arm $e$ similar to the vertical journal-arm $i$, but shorter and having its top and bottom portions bent outwardly to form lugs $f\ f$, which contain apertures which coincide with the apertures in the lugs $h\ h$. Through all these apertures in the two pairs of lugs passes the pin $t$ through the spiral spring $u$, placed between the inner lugs, the said pin being fastened in position by the screw-threads, as heretofore pointed out, the upper end of the coil-spring passing in front of the vertical journal-arm $i$ of the lens-piece and the lower end of the spring passing in front of the vertical journal-arm $e$ of the saddle-bridge, as shown in Figs. 2 and 3. This description, as heretofore stated, has been confined to the saddle-bridge and its adjacent lens and guard piece to the left of the drawing, but is merely the reverse construction and manner of operation to that of the right of the drawing. The saddle-bridge, like the guards, is also made out of flat or ribbon-like stock and may be sheared, bent, or struck up, and twisted out of one single piece, thus making the bridge strong and durable by the elimination of soldered parts or parts otherwise fastened together. The ends of the saddle portion of the bridge are bent rearwardly and outwardly, as shown at $d\ d'$, and then inwardly upon themselves at $c\ c'$ and forwardly and inwardly again at $b\ b'$, thus forming a loop or bend at each extremity of the saddle-bridge, terminating in the vertical arms $e\ e'$. These bends, taken as a whole, extend rearwardly and outwardly and preferably downwardly between the upper and lower guard-arms $k\ l$ and $k'\ l'$ in order to bring the vertical journal-pieces $e\ e'$, having outwardly-extending lugs $f\ f$ and $f'\ f'$, respectively, well forward and toward the middle of the saddle-bridge.

The construction of the guard and lens piece at the right is shown in Figs. 2 and 3, wherein $m'\ n'$, respectively, represent the nose-grips, $k'\ l'$ the arms connecting the same with the vertical journal-arm $i'$, which terminates at its top and bottom, respectively, in the inwardly-extending lugs $h'\ h'$, adjacent to which is the lens-holder, its front side being shown at $s'$ and the upper and lower bands at $q'\ q'$ and the side arms at $r'\ r'$. The right-hand guard and lens piece are connected up with the saddle-bridge by the pin $t'$ and spring $u'$.

In Figs. 7 and 8 is illustrated a modification in which the vertical post $t^2$ is soldered or otherwise secured at its middle portion to the face $o^2$ of the body portion instead of extending through the upper and lower lugs $h\ h$, as illustrated in the other figures. The upper and lower ends of the post $t^2$ are journaled in the lugs $f^2\ f^2$, turned outwardly from the plate $e^2$ of the bridge-piece. The relative movement between the guard and lens piece and the bridge-piece is resisted by the spiral spring $u^2\ u^2$, surrounding the upper and lower extremities of the post $t^2$, in the same manner as the spring $u$ resists the relative movement between the corresponding parts in the other figures. The upper and lower guard-arms $k^2$ and $l^2$ terminate, respectively, at their inner ends in the disks $m^2$ and $n^2$ and at their outer extremities terminate in the vertical arm $i^2$, which latter is soldered or otherwise secured to the rear of the body portion. The top of the body portion is indicated at $p^2$, and $r^2\ r^2$ are the side arms, and $q^2\ q^2$ the rims, of the lens-piece. The end of the bridge-piece is bent upon itself at $d^2\ c^2\ b^2$, the said bend terminating in vertical arms $e^2$ and the outwardly-projecting lugs $f^2\ f^2$.

The above-described device is only a preferred form of my invention, as I may utilize any other construction to accomplish the same result—as, for instance, bends in the saddle-bridge may be of different contour. The vertical pieces $e$ and $e'$, respectively, of the bridge may be in the form of a vertical post, which in turn may be journaled in the upper and lower lugs, respectively, of the lens-piece, or the upper and lower lugs of the lens-piece may be brought nearer together, and the saddle-bridge may terminate in single flat lugs instead of two lugs. For the guard-arms illustrated and described may be substituted any other guards well known in the art, and for the spiral springs may be substituted any other yielding resistance which will perform a like function, provided the same is independent and separate from the rigid saddle-bridge and its adjacent guard and lens pieces. For the saddle-bridge may be substituted any other type of bridge, even though the same be not in contact with the nose, so long as the same is rigid and independent of the yielding means between the extremities of the bridge and its adjacent guard and lens pieces. Further, all of these details may be interchanged wherever such interchange may be consistent with the various constructions.

Having thus described the structure of my invention, I will now proceed to explain the operation thereof: When the device is not in use, each lens, respectively, will be thrown back to the position shown in Fig. 3, which position of the lenses is due to the resilient action between the saddle-bridge and its respective guard and lens pieces. To locate the eyeglasses for use upon the nose, the lenses, respectively, are swung forward upon their adjacent pivotal and resilient connections with the saddle-bridge until the two pairs of guard-grips, respectively, are spread apart to such a distance as to admit the nose between them. In this position the lenses are swung well forward. The lenses are then released; but the frame is held in position upon the nose by its contact with the saddle-bridge, which is a sufficient support until the lenses are thrown back to a position in which the guard-plates grip the nose between them. In this position the lenses should be in the same plane with each other and in their proper location in front of the eyes. The lenses may be adjusted to accomplish this result and also to effect their proper distance from each other by bending or twisting their respective guard-arms and the loops at the extremities of the saddle-bridge, all these parts being rigid, but made up on pliable metal. When the frames are in their normal position upon the nose, the saddle-bridge may extend outwardly at right angles to the plane of the lenses, or upwardly and outwardly, or may be of any peculiar configuration so long as the same is rigid. Although I have illustrated and described two sets of guards of a peculiar configuration, together with a peculiar lens-holder adapted to be integral with the same, yet any other construction of guards, guard-grips, and lens-holder may be utilized, provided they will perform the function of gripping the nose by a resilient connection between the lens-holder and the extremity of the rigid saddle-bridge.

Wherever I have used the expression "guard and lens piece," I refer to one integral element consisting of the lens-holder and the guard arm or arms, as the case may be, so that throughout the claims this expression is to be construed as one element alone and by itself. I have said that the guard and lens piece may terminate in a post instead of lugs, and by this I mean a post either connected between two lugs or a post attached to its middle portion to the lens and guard piece. In the latter case of course the spring could not be coiled the entire length of the post, since the middle portion intervenes and would thus necessitate two springs or one spring either below or above the junction with said guard and lens piece. Where I speak of "yielding connections," I wish to include a frictional yielding connection, such as is common in the ordinary friction-journals, for instance, when the single flat lug of the bridge-piece is placed between and in frictional contact with the upper and lower lugs of the lens and guard piece.

I am aware that the prior art discloses devices wherein the guards grip the nose by swinging forward the lens as herein described, and while not admitting that there is no invention in any of the peculiar details of construction illustrated and described to carry out my invention, yet I do not wish to limit myself to these, but reserve the right to utilize any other well-known means which will accomplish the same or equivalent results, and although I have used various expressions, such as "bridge," "lens and guard holder," "lens-holder," "guards," "guard-plates," "arms," "vertical arms," "pins," and "spiral springs," yet I do not wish to confine myself to the structure defined by the nomenclature of these various parts, but further reserve the right to utilize any of the well-known equivalents thereof, provided the same are within the scope of my invention as set forth in the appended claims.

Having now described my invention and the manner of operation thereof, what I desire to claim and to secure by Letters Patent is—

1. In a pair of eyeglasses the combination with a rigid bridge terminating at each end in two apertured lugs the one superposed above the other, of rigid guard and lens pieces each having two apertured lugs, the one superposed above the other, each pair of the first-mentioned lugs being located between the last-mentioned lugs on the bridge-piece at its adjacent ends respectively, a journal-pin fixed between the superposed lugs at each end of the bridge respectively, spiral springs surrounding each pin between the lugs of the respective guard and lens pieces, the said springs being located in such a manner as to resist the swinging of the respective guard and lens pieces on their respective pins.

2. In a pair of eyeglasses the combination with a rigid bridge-piece terminating at each end in two vertically-disposed apertured lugs, of rigid guard and lens pieces, each having two vertically-disposed apertured lugs, each pair of lugs on one piece being located between the pair of lugs on the adjacent piece, a journal-pin extending through the superposed lugs at each end of the bridge and resilient means adapted to resist the swinging of the respective guard and lens pieces on their respective journaled connections.

3. In a pair of eyeglasses the combination with a rigid bridge-piece terminating at each end in two apertured lugs, the one superposed above the other, of rigid guard and lens pieces each having two apertured lugs the one superposed above the other, the apertures of each pair of lugs on the respective ends of the bridge-piece being in alinement with the apertures of the adjacent pair of lugs on the guard and lens pieces, a journal-pin extending through the apertures of the alined lugs at each end of the bridge respectively, spiral springs surrounding each pin between the innermost lugs the said springs being located in such a manner as to resist the swinging of the respective guard and lens pieces on their respective pins.

4. In a pair of eyeglasses the combination with a bridge having its extremities bent upon themselves forming rearwardly-extending loops or bends and flat vertical portions having outwardly-extending upper and lower apertured lugs, the said loops or bends terminating at and integral with the inner edges of said flat vertical portions, of rigid guard and lens pieces and means for yieldingly journaling said pieces to the apertured lugs on the bridge.

5. In a pair of eyeglasses the combination with a rigid bridge of rigid guard and lens pieces the said bridge having its ends terminating in one of the edges of vertical journal-plates respectively the said plates having upper and lower apertured lugs and means located on said guard and lens pieces for yieldingly journaling the same to the apertured lugs in the respective extremities of the bridge.

6. In a pair of eyeglasses the combination with a rigid bridge of rigid guard and lens pieces, the said bridge consisting of a saddle portion and vertical journal-plates having outwardly-extending upper and lower apertured lugs the ends of said saddle portion terminating in one of the edges of said vertical journal-plates respectively and the said saddle portion and vertical journal-plates being sheared, bent and twisted out of one flat or ribbon-like piece of metal and means located on said guard and lens pieces for yieldingly journaling the same to the apertured lugs in the respective extremities of the bridge.

7. In a pair of eyeglasses the combination with a rigid bridge, of a rigid guard and lens piece, the said bridge, consisting of a saddle portion having its extremities bent upon themselves forming rearwardly and outwardly extending loops or bends the ends of which terminate in the respective edges of vertical journal-plates, the said journal-plates having upper and lower outwardly-extending lugs and the said saddle portion and vertical journal-plates being sheared, bent and twisted out of a single piece of flat ribbon-like metal, and means including a post located on each guard and lens piece, for yieldingly journaling the said pieces in the apertured lugs on the bridge.

8. In a pair of eyeglasses the combination with a rigid bridge-piece, of a lens-holder having rims and side arms, a vertical journal-arm having inwardly-extending upper and lower apertured lugs and rearwardly-extending guard-arms, the said vertical journal-arm, lugs and guard-arms being sheared, bent and twisted out of one flat or ribbon-like piece of metal and rigidly attached to said lens-holder, means for journaling the said apertured lugs to the adjacent ends of the bridge-piece and resilient means adapted to resist the swinging of the respective lugs on their respective journal connections.

9. In a pair of eyeglasses the combination with a rigid bridge-piece, of a lens-holder having rims and side arms, a vertical journal-piece having inwardly-extending upper and lower apertured lugs and rearwardly-extending guard-arms the said vertical journal-piece, lugs and guard-arms being sheared, bent and twisted out of one flat or ribbon-like piece of metal, means including a post for journaling said apertured lugs to the adjacent ends of the bridge and resilient means including a spiral spring surrounding said post the said spring being located in such a manner as to resist the swinging of the lugs on the post.

10. In a pair of eyeglasses the combination with a rigid bridge-piece, of a lens-holder having rims and side arms, a flat vertical journal-piece having inwardly-extending upper and lower apertured lugs and from its rearward edge having rearwardly-extending guard-arms, the said vertical journal-piece, lugs and guard-arms being sheared, bent and twisted out of one flat or ribbon-like piece of metal, means for journaling the said apertured lugs to the adjacent portions of the bridge-piece, and resilient means adapted to resist the swinging of the respective lugs on their respective journal connections.

11. In a pair of eyeglasses the combination with a rigid bridge-piece, of a lens-holder having rims and side arms, a flat vertical journal-piece having inwardly-extending upper and lower apertured lugs and from its rearward edge having rearwardly-extending guard-arms, the said vertical journal-piece, lugs and guard-arms being sheared, bent and twisted out of one flat or ribbon-like piece of metal, means including a post for journaling said apertured lugs to the adjacent ends of the bridge and resilient means including a spiral spring surrounding said post the said spring being located in such a manner as to resist the swinging of the lugs on the post.

12. In a pair of eyeglasses, the combination with a rigid bridge-piece, of guard and lens pieces each consisting of rims and side arms, a flat vertical journal-piece having inwardly-extending upper and lower apertured lugs and guards terminating in said flat vertical journal-piece at their forward ends, the said journal-piece, lugs and guards being sheared, bent and twisted out of one flat or ribbon-like piece of metal, and rigidly attached to the lens-holder and means for yieldingly journaling the said apertured lugs to the adjacent portions of the bridge-piece.

Signed at Ansonia, in the county of New Haven and State of Connecticut, this 17th day of May, 1905.

FRED J. PECK.

Witnesses:
 FREDERICK W. HOLDEN,
 ADA M. GESNER.